(12) United States Patent
Maruyama et al.

(10) Patent No.: US 8,864,325 B2
(45) Date of Patent: Oct. 21, 2014

(54) POWER TRANSMISSION DEVICE

(75) Inventors: Kazuya Maruyama, Niigata (JP); Kouichi Jinushi, Niigata (JP); Yoshiko Adachi, Niigata (JP)

(73) Assignee: Nippon Seiki Co., Ltd., Nigata (JP)

( * ) Notice: Subject to any disclaimer, the term of this patent is extended or adjusted under 35 U.S.C. 154(b) by 292 days.

(21) Appl. No.: 12/992,249

(22) PCT Filed: May 7, 2009

(86) PCT No.: PCT/JP2009/058614
§ 371 (c)(1),
(2), (4) Date: Nov. 11, 2010

(87) PCT Pub. No.: WO2009/145036
PCT Pub. Date: Dec. 3, 2009

(65) Prior Publication Data
US 2011/0061482 A1   Mar. 17, 2011

(30) Foreign Application Priority Data
May 26, 2008   (JP) .................................. 2008-136476

(51) Int. Cl.
*G02B 7/182*   (2006.01)
*F16H 25/20*   (2006.01)
*G02B 27/01*   (2006.01)

(52) U.S. Cl.
CPC ........ *G02B 27/0149* (2013.01); *F16H 25/2015* (2013.01)
USPC .......... 359/873; 74/89.23; 248/488; 359/871; 359/872

(58) Field of Classification Search
USPC ............ 74/89.23, 89.25, 89.26, 89.32, 89.33, 74/89.37, 89.39, 89.34; 359/841, 359/871–877; 248/229.16, 229.26, 488
See application file for complete search history.

(56) References Cited

U.S. PATENT DOCUMENTS

| | | | |
|---|---|---|---|
| 4,995,712 A * | 2/1991 | Mori | 359/840 |
| 5,279,175 A * | 1/1994 | Kasuga et al. | 74/424.86 |
| 5,499,547 A * | 3/1996 | Nagai et al. | 74/89.34 |
| 5,649,451 A * | 7/1997 | Ruland | 74/89.3 |
| 5,799,543 A * | 9/1998 | Nagai et al. | 74/490.09 |
| 5,910,192 A * | 6/1999 | Pulford et al. | 74/479.01 |

(Continued)

FOREIGN PATENT DOCUMENTS

| | | |
|---|---|---|
| JP | 59-132787 | 7/1984 |
| JP | 11-119147 | 4/1999 |

(Continued)

*Primary Examiner* — Troy Chambers
*Assistant Examiner* — Alexander Vu
(74) *Attorney, Agent, or Firm* — McDermott Will & Emery LLP (57) ABSTRACT

A power transmission device which is free from a possibility of breakage of a driving member is provided. A stepping motor (driving member) 61*a* configured to be driven on the basis of a command signal from a controller 70, a lead screw portion 61*c* configured to be rotationally driven in association with the drive of the stepping motor 61*a*, and a power transmitting member 65 configured to move along an axial direction X of the lead screw portion 61*c* in accordance with the rotation of the lead screw portion 61*c* and transmit a power to a power transmitted member 42*e* are provided, and the controller 70 is configured to control the output of the command signal to the stepping motor 61*a* to be stopped when the power transmitting member 65 is not moved along the axial direction X.

7 Claims, 4 Drawing Sheets

(56) References Cited

U.S. PATENT DOCUMENTS

| | | | |
|---|---|---|---|
| 5,957,798 A * | 9/1999 | Smith et al. | 475/5 |
| 5,980,052 A * | 11/1999 | Thor et al. | 359/877 |
| 6,038,127 A * | 3/2000 | Ries | 361/679.08 |
| 6,240,796 B1 * | 6/2001 | Yamada | 74/89.23 |
| 6,497,539 B2 * | 12/2002 | Marroncelli | 409/146 |
| 6,726,337 B2 * | 4/2004 | Whitehead et al. | 359/841 |
| 2002/0144561 A1* | 10/2002 | Nagai et al. | 74/89.33 |
| 2002/0176181 A1* | 11/2002 | Jacobsen | 359/877 |
| 2004/0216543 A1* | 11/2004 | Nagai et al. | 74/89.33 |
| 2005/0011291 A1* | 1/2005 | Nagai et al. | 74/89.32 |
| 2005/0178232 A1* | 8/2005 | Suda et al. | 74/498 |
| 2006/0001990 A1* | 1/2006 | Andreasch et al. | 359/876 |
| 2006/0022896 A1* | 2/2006 | Kumon et al. | 345/7 |
| 2007/0138901 A1* | 6/2007 | Bin | 310/257 |
| 2011/0061482 A1* | 3/2011 | Maruyama et al. | 74/89.23 |

FOREIGN PATENT DOCUMENTS

| | | |
|---|---|---|
| JP | 2003-335148 | 11/2003 |
| JP | 2005-069323 | 3/2005 |
| JP | 2005-069323 A | 3/2005 |

* cited by examiner

POWER TRANSMISSION DEVICE

RELATED APPLICATIONS

This application is the U.S. National Phase under 35 U.S.C. §371 of International Application No. PCT/JP2009/058614, filed on May 7, 2009, which in turn claims the benefit of Japanese Application No. 2008-136476, filed on May 26, 2008, the disclosures of which Applications are incorporated by reference herein.

TECHNICAL FIELD

The present invention relates to a power transmission device provided with a power transmitting member configured to be operated in association with the drive of a driving member made up of a stepping motor or the like, and configured to transmit a power to a power transmitted member on the basis of the operation of the power transmitting member.

BACKGROUND ART

In the related art, there is a known power transmission device of this type, which is configured to adjust the angular position of a mirror holder which holds a concave mirror by driving a stepping motor (driving member) for causing the concave mirror provided in a head-up display apparatus for a vehicle to rotate about a predetermined axis of rotation as described in Patent Document 1 for example.

CITED REFERENCE

Patent Document

Patent Document 1: JP-A-2003-335148

In other words, the head-up display apparatus for a vehicle described in Patent Document 1 mainly includes a display configured to emit display light, a reflector configured to reflect the display light emitted from the display, and a housing that accommodates the display and the reflector, and is configured to project the display light reflected by a concave mirror provided in the reflector onto a front glass of the vehicle (irradiate a front glass of the vehicle with the display light) through a light-output portion formed on the housing to allow a user (passenger) of the vehicle to visually recognize a displayed image (virtual image) obtained by such irradiation.

In this case, the reflector includes the concave mirror configured to reflect the display light from the display, the mirror holder configured to hold the concave mirror, and a power transmission device formed integrally with the mirror holder and configured to transmit a power to a shaft member extending on the axis of rotation.

The power transmission device as described above includes the stepping motor, a gear fixed to a distal end of a revolving shaft of the stepping motor, and a gear portion disposed on the mirror holder so as to engage the gear. The gear portion is fixed to the distal end of the shaft portion formed integrally with the mirror holder so as to position on the axis of rotation of the mirror holder. In this case, the stepping motor is a known PM-type stepping motor, which mainly includes two exciting coils wound around an annular bobbin, two sets of annular yokes corresponding to these exciting coils, and a rotor including a permanent magnet which is rotatably stored in a hollow portion of the annular yokes and the exciting coil-layered member, and the revolving shaft supports the rotor.

The user (occupant) of the vehicle is allowed to adjust the direction of projection of the display light with respect to the front glass by moving the concave mirror in angle (that is, to set the angular position of the concave mirror within a movable range between an upper limit position and a lower limit position) by operating a push-button switch, not shown, for example.

In other words, when an operation signal in association with the operation of the push-button switch is supplied to a controller made up of a microcomputer, the controller outputs a command signal (drive signal) for driving the stepping motor so that the angular position of the concave mirror is set to a predetermined position on the basis of the operation signal. Then, when the stepping motor is driven on the basis of the drive signal, the drive force generated by the stepping motor is transmitted to the gear portion via the gear. In association with the transmission of the power (drive force) to the gear portion as described above, the gear portion rotates about the shaft member (that is, the axis of rotation of the mirror holder) whereby the mirror holder and the concave mirror held by the mirror holder rotate about the axis of rotation, so that the concave mirror is disposed at the predetermined angular position. By angularly moving the concave mirror in this manner, the direction of projection of the display light with respect to the front glass is adjusted and, in association with this, the position of the display image which is visible for the occupant can be moved in the vertical direction on the front glass.

SUMMARY OF INVENTION

Problems to be Solved by the Invention

Incidentally, in a case of a configuration in which the power is transmitted to the shaft member via the gear fixed to the revolving shaft of the stepping motor and the gear portion fixed to the shaft member so as to engage the shaft in association with the driving of the stepping motor and the angular position of the mirror holder (that is, the concave mirror) is adjusted according to the rotation of the shaft member as described above, the angular position (disposed position) of the mirror holder is needed to be held (maintained) at a position assumed after having completed the adjustment by exciting the exciting coil so as to prevent the gear (gear portion) from rotating after having completed the adjustment of the angular position of the mirror holder.

In other words, the controller performs control to output a mirror-holder-position maintaining control signal for maintaining the position where the mirror holder is disposed to the position assumed after having completed the adjustment to the stepping motor even after having adjusted the angular position of the mirror holder.

Then, the stepping motor (driving member) having received the control signal excites the exciting coil after having completed the adjustment of the angular position of the mirror holder, whereby a configuration in which the angular position of the mirror holder is maintained at the position assumed after having completed the adjustment of the angular position of the mirror holder. However, in this configuration, even after having completed the adjustment of the angular position of the mirror holder, an electric current continuously flows through the exciting coil provided in the stepping motor. Therefore, the heating value generated by the stepping motor by itself is increased, whereby there is a possibility of breakage of the stepping motor.

Accordingly, in order to cope with the problem described above, it is an object of the present invention to provide a power transmission device which has no possibility of breakage of the driving member.

Means for Solving the Problems

The present invention provides a power transmission device including: a driving member configured to be driven on the basis of a command signal from a controller; a lead screw portion configured to be rotationally driven in association with the drive of the driving member; and a power transmitting member configured to move along an axial direction of the lead screw portion in accordance with the rotation of the lead screw portion to transmit the power to a power transmitted member, characterized in that the controller is configured to control the output of the command signal to the driving member to be stopped when the power transmitting member is not moved along the axial direction.

The present invention is characterized in that a moving member configured to be engaged with the lead screw portion and move along the axial direction in accordance with a thrust given by the rotation of the lead screw portion is provided and the power transmitting member moves along the axial direction synchronously with the movement of the moving member.

The present invention is characterized in that the power transmitting member is formed with an insertion portion configured to allow insertion of a guide shaft, which extends in substantially parallel to the lead screw portion.

Advantages of the Invention

According to the present invention, the initial object is achieved, and the power transmission device which is free from the possibility of the breakage of the driving member is provided.

BEST MODES FOR CARRYING OUT THE INVENTION

Referring now to the attached drawings, an embodiment in which a power transmission device in the present invention is applied to a second reflector provided, for example, in a head-up display apparatus for a vehicle will be described.

Figure 1:
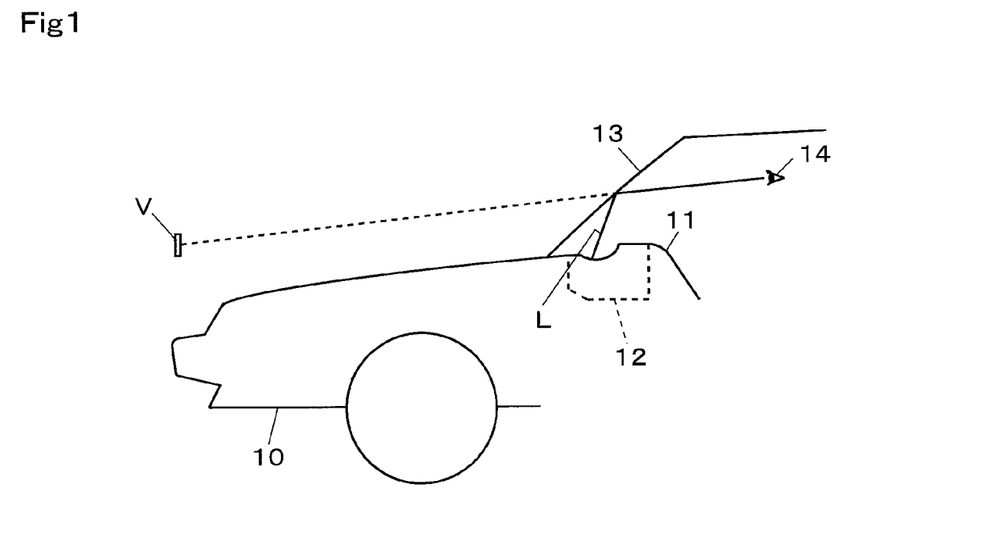
FIG. 1 is a schematic view of a head-up display apparatus according to an embodiment of the present invention.

The head-up display apparatus is an apparatus configured to display a virtual image V by causing display light L which is projected by a display apparatus 12 as a display unit disposed in the interior of an instrument panel 11 of a vehicle 10 to reflect in the direction toward a driver (user) 14 of the vehicle 10 using a front glass 13 of the vehicle 10, which is a projecting member, as shown in FIG. 1. In other words, the head-up display apparatus is configured to emit (project) the display light L emitted from a liquid crystal display, described later, of the display apparatus 12 to (on) the front glass 13 (the projecting member) to allow the user 14 to visually recognize the displayed image (virtual image) V obtained by this emission. Accordingly, the user 14 is able to observe the virtual image V and the landscape in superimposed manner.

Figure 2:
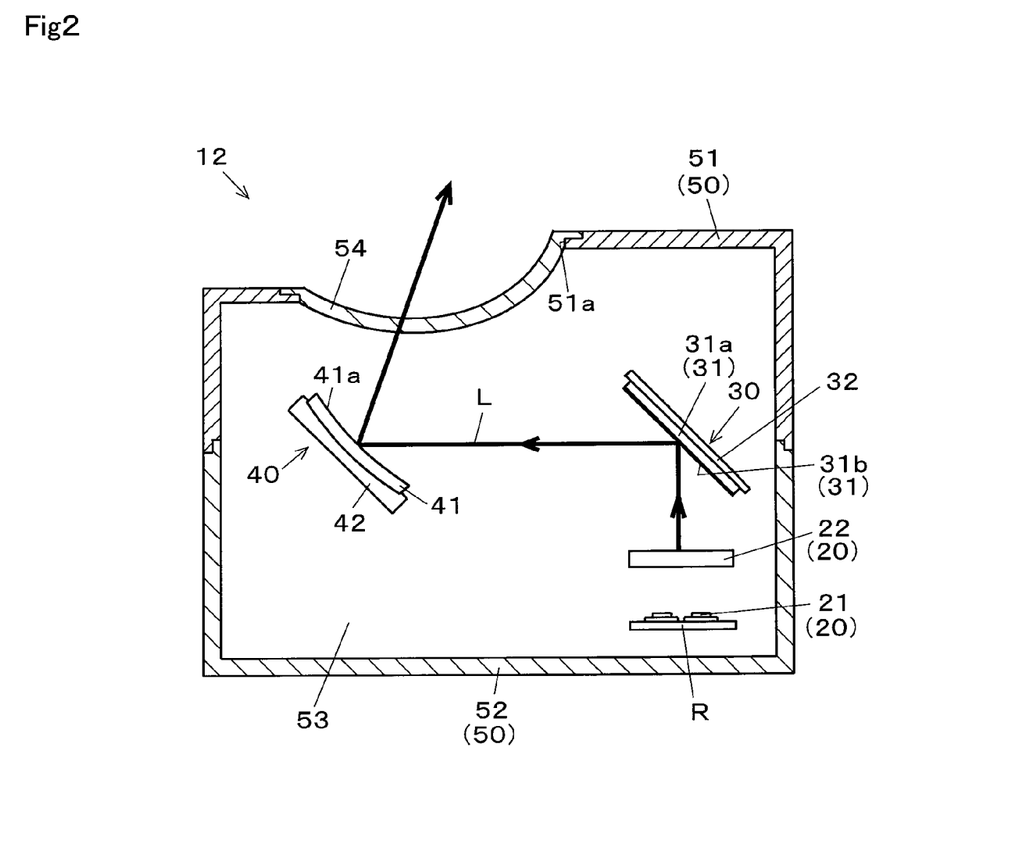
FIG. 2 is a cross-sectional view of the head-up display apparatus according to the same embodiment.

The display apparatus 12 mainly includes a liquid crystal display 20, a first reflector 30, a second reflector 40, and a housing 50 as shown in FIG. 2.

The liquid crystal display 20 mainly includes a light source 21 having a light-emitting diode mounted on a wiring substrate R, and a TFT-type liquid crystal display element (display element) 22 positioned on the front side (right above) of the light source 21 so as to allow passage of an illuminating light emitted from the light source 21 to form the display light L. This means that the light source 21 is disposed behind (right below) the liquid crystal display element 22, and the liquid crystal display element 22 displays predetermined information (information to be displayed, described later) by the illuminating light emitted from the light source 21. The liquid crystal display 20 as described above is provided in the housing 50 in such a manner that the surface thereof on the side where the display light L is emitted opposes a cold mirror, described later, of the first reflector 30, and is fixed and held at the position and orientation so that the optical axis of the display light L intersects the cold mirror.

The liquid crystal display element 22 displays the information to be displayed (for example, the vehicle speed or the number of revolutions of an engine) by an element drive circuit, not shown, in numerical values or the like by emitting light. The liquid crystal display 20 is configured to output the display light L made up of a light in a visible wavelength band, and the light source 21 which emits, for example, red light (mainly, the wavelength band of emitted light; 610 to 640 nm) can be applied thereto. The information to be displayed is not limited to the vehicle speed and the number of revolutions of the engine, but it is needless to say that any display modes can be employed.

The first reflector 30 includes a cold mirror 31, and a mounting member 32 configured to mount and fix the cold mirror 31 using predetermined mounting means. The cold mirror 31 includes a substantially rectangular glass substrate 31a, and a first reflecting layer 31b formed on one surface (the surface opposing a concave mirror of the second reflector 40, described later) of the glass substrate 31a. The first reflecting layer 31b as described above includes a number of layers of interference films having different film thicknesses, and is formed using a method such as deposition. The cold mirror 31 is disposed in an inclined state at a position to reflect the display light L emitted from the liquid crystal display 20 toward the second reflector 40 (above-described concave mirror).

The cold mirror 31 reflects the light in the visible wavelength band (450 to 750 nm) including the wavelength band of the emitted light from the liquid crystal display 20 at a high reflectance ratio (for example, 80% or more), and reflects the light other than the light in the above-described visible wavelength band at a low reflectance ratio. The cold mirror 31 applied in this case reflects lights out of the visible wavelength band, specifically, lights in infrared wavelength band (caloric ray or heat ray of sunlight) at the low reflectance ratio (for example, 15% or less). The light, which is not reflected by the first reflecting layer 31b, is allowed to pass through the cold mirror 31.

In the case of this embodiment, the cold mirror 31 and the liquid crystal display 20 are disposed at positions which cannot be viewed directly from a translucent cover, described later, of the housing 50, so as not to be directly exposed to light from the outside (outside light) such as the sunlight. The mounting member 32 is formed of synthetic resin in, for example, black color, and is fixed to the housing 50.

Figure 3:
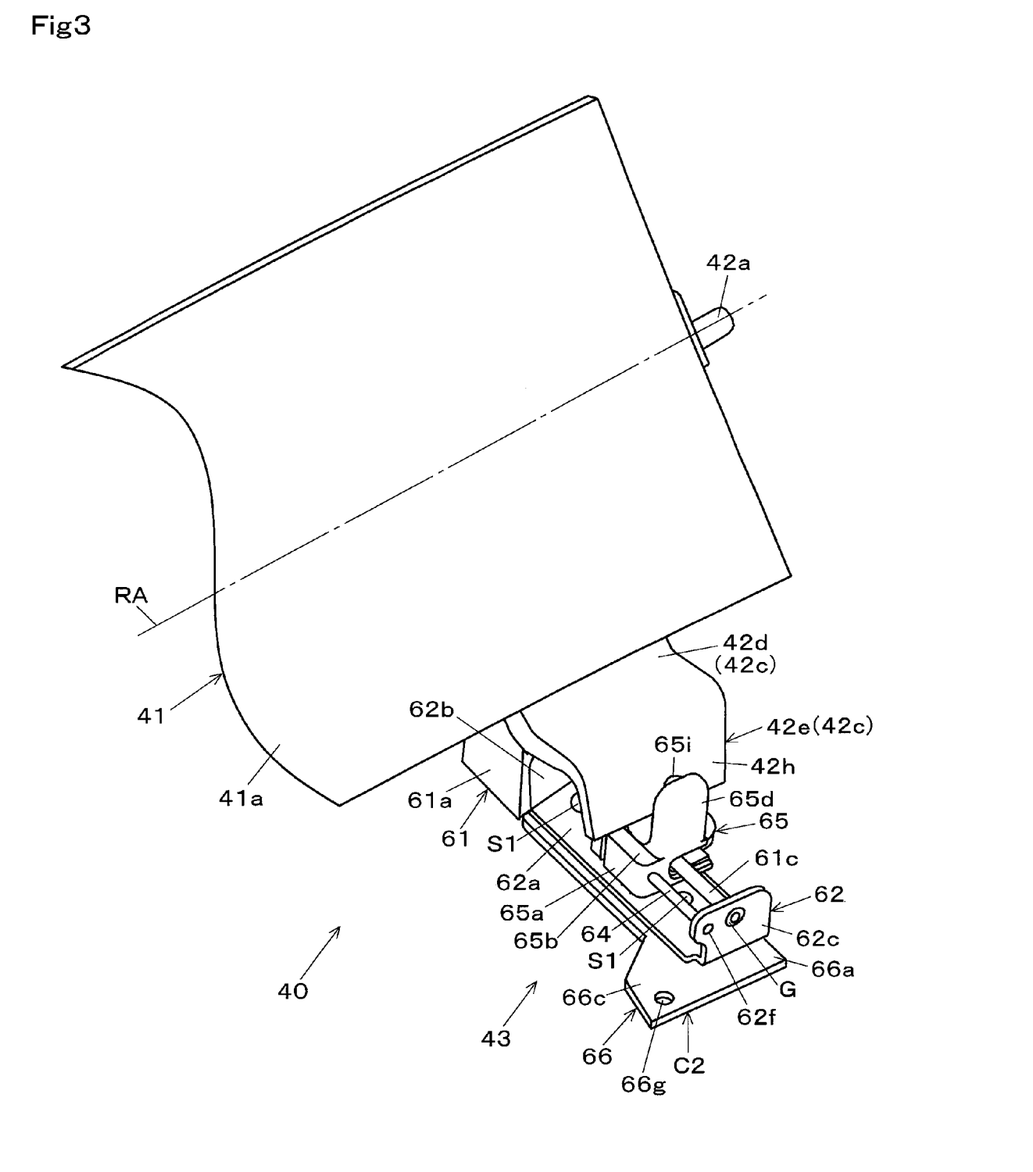
FIG. 3 is a perspective view showing a second reflector according to the same embodiment.
Figure 4:
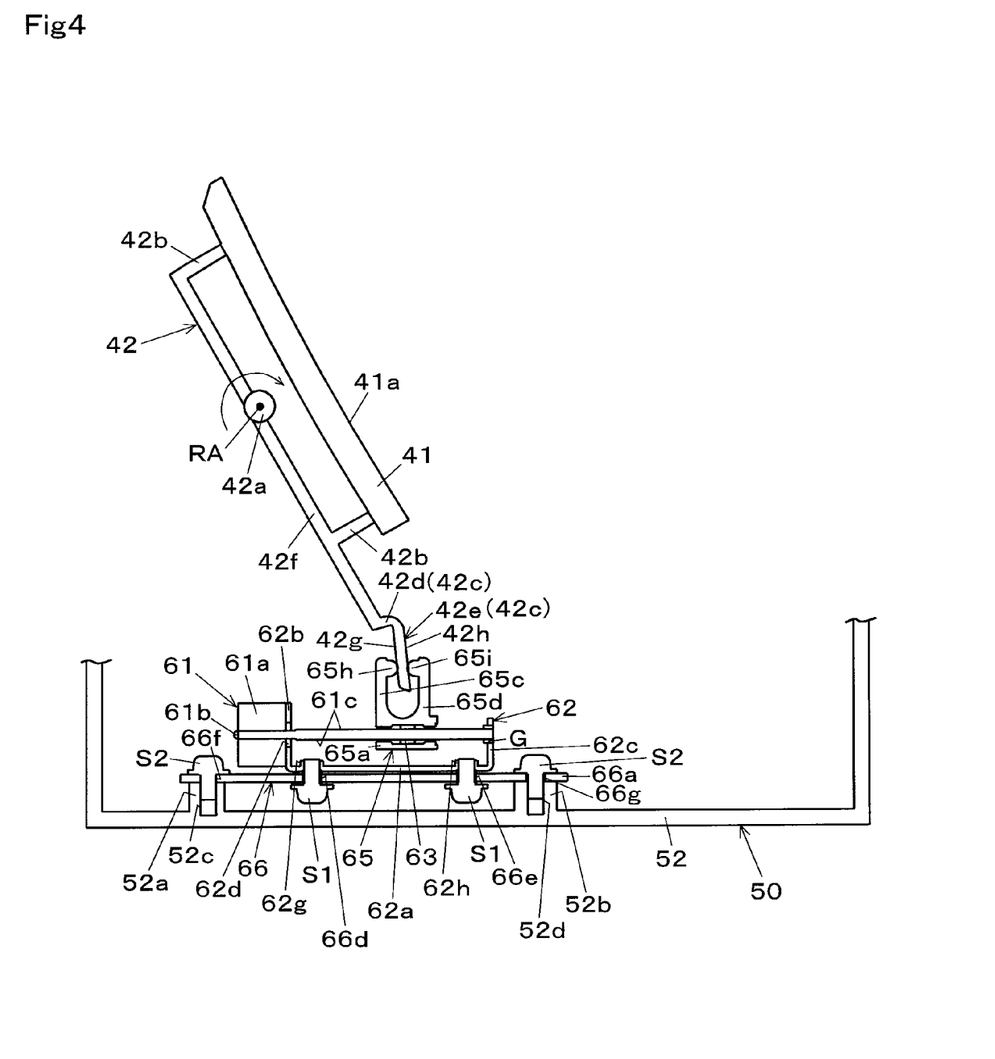
FIG. 4 is a cross-sectional view showing the second reflector and a required portion of a housing according to the same embodiment.

The second reflector 40 includes a concave mirror (reflecting member) 41 configured to reflect the display light L from the cold mirror 31 (that is, the liquid crystal display element 22), a mirror holder 42 configured to hold the concave mirror 41, and a power transmission device 43 configured to transmit a power to a suspending portion, described later, of the mirror holder 42 so as to adjust the angular position (disposed position) of the mirror holder 42, as shown in FIG. 2 to FIG. 4.

The concave mirror 41 is formed by depositing a second reflecting layer 41a on a resin substrate formed of polycarbonate having a depressed surface. The concave mirror 41 as described above is disposed in an inclined state at a position where the second reflecting layer 41a thereof opposes the cold mirror 31 and the translucent cover and can be viewed from the translucent cover.

The concave mirror 41 is configured to reflect (project) the display light L from the cold mirror 31 toward the translucent cover (the front glass 13 of the vehicle 10) while enlarging the scale thereof. This means that the concave mirror 41 enlarges the display light L reflected by the cold mirror 31 and projects the enlarged display light L to the front glass 13 via the translucent cover.

The mirror holder 42 is formed of synthetic resin material, and includes a shaft member 42a in a substantially column shape axially supported by a bearing portion (not shown) provided in the housing 50. The mirror holder 42 as described above includes holding portions 42b each having a wall portion for holding the concave mirror 41. In this case, double coated tapes (not shown) are interposed between the concave mirror 41 and the holding portions 42b so that the concave mirror 41 is fixedly held by the holding portions 42b. The mirror holder 42 and the concave mirror 41 held thereby have a configuration which is movable in angle (rotatable) about an axis of rotary movement RA as a center axis of the shaft member 42a.

Reference numeral 42c designates a projecting strip formed under the concave mirror 41 so as to project in a substantially L-shape from behind the concave mirror 41 toward the second reflecting layer 41a, and the projecting strip 42c includes a tongue strip 42d and a suspending portion 42e, and is integrally formed with the mirror holder 42. The suspending portion 42e of the projecting strip 42c provided on the mirror holder 42 corresponds to a power transmitted member according to claim 1 in the present application.

The tongue strip 42d in FIG. 4 is formed of a substantially rectangular flat panel extending from a bottom surface portion 42f, which constitutes the bottom wall of the holding portions 42b of the mirror holder 42 toward the second reflecting layer 41a (that is, extending substantially along the direction of the axis of a lead screw portion, described later).

The suspending portion 42e as the power transmitted member includes an upright wall portion of a substantially rectangular flat panel shape, which is formed continuously from the tongue strip 42d so as to be suspended downward from a distal end portion of the tongue strip 42d (the side of the lead screw portion). The suspending portion 42e as described above is sandwiched between first and second projecting portions in such a manner that both surfaces 42g, 42h (see FIG. 4) come into point contact with a pair of the first and second projecting portions of the power transmitting member, described later, provided on the power transmission device 43.

Figure 5:
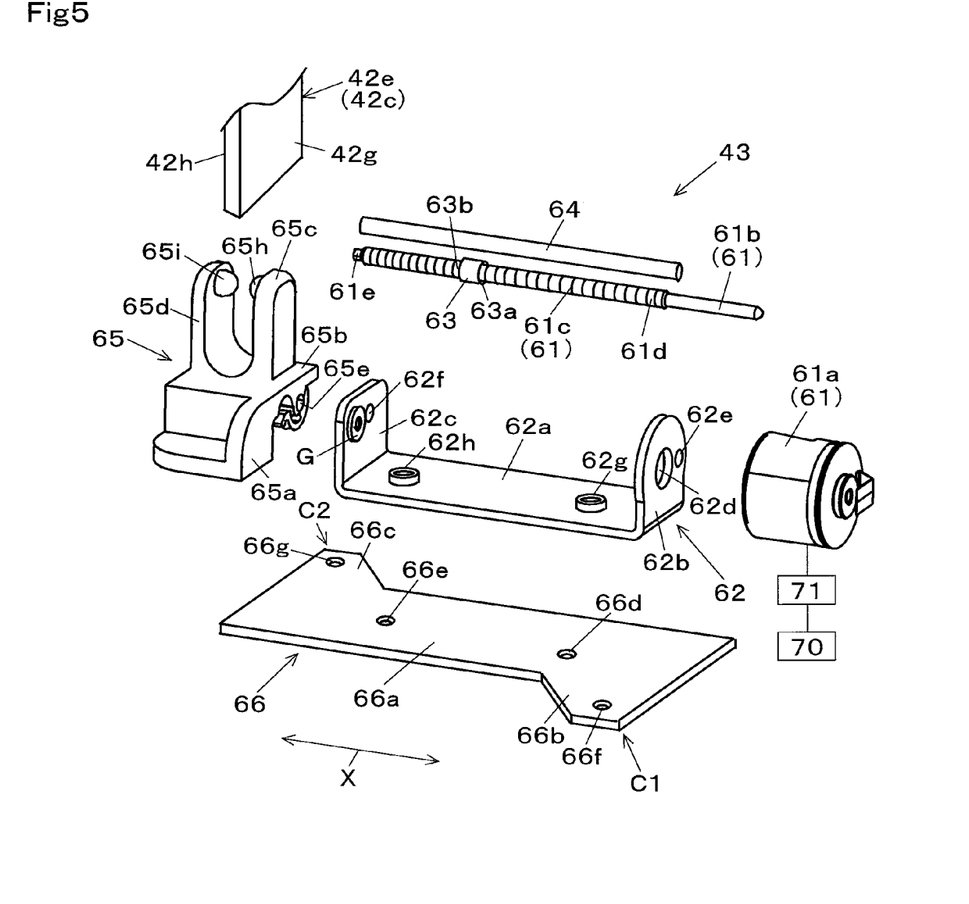
FIG. 5 is a perspective view showing a power transmitted member and a power transmission device according to the same embodiment.

The power transmission device 43 mainly includes a drive means 61, a supporting member 62, a moving member 63, a guide shaft 64, a power transmitting member 65, and an oscillation preventing member 66, and is used for rotating the mirror holder 42 about the axis of rotary movement RA to adjust the angular position of the mirror holder 42 (concave mirror 41) (that is, to adjust the direction of projection of the display light L) as shown in FIG. 3 to FIG. 5.

The drive means 61 includes a stepping motor (driving member) 61a as a known PM-type (Permanent Magnet type) stepping motor which generates a rotational drive force by energizing, and a revolving shaft 61b extending from the stepping motor 61a. In this case, the revolving shaft 61b includes a lead screw portion 61c having a thread groove formed on the peripheral surface thereof in a spiral shape, which is rotationally driven in association with the drive of the stepping motor 61a. In other words, the lead screw portion 61c (revolving shaft 61b) as described above is configured to be rotationally driven upon receipt of the rotational drive force from the stepping motor 61a.

In FIG. 5, reference numeral 70 designates a controller composed of a microcomputer including ROM, RAM, and CPU, and the stepping motor 61a is driven on the basis of a command signal (drive signal) from the controller 70. The drive signal supplied from the controller 70 is supplied to a motor drive circuit 71 connected to the controller 70.

Upon receipt of an operation signal supplied from a push-button switch (operating means), not shown, operated by the user 14 for example, the controller 70 supplies the drive signal to the motor drive circuit 71 in order to move the power transmitting member 65 to a predetermined set position according to the operation signal. Then, the motor drive circuit 71 having received the drive signal supplies a signal to drive the stepping motor 61a, whereby the stepping motor 61a is driven and the lead screw portion 61c is rotationally driven in association with the drive of the stepping motor 61a.

The supporting member 62 is formed of a metallic motor case which fixedly supports the stepping motor 61a in an immovable state, is formed into a substantially U-shape in cross-section, and includes a substantially plate-shaped flat panel portion 62a disposed so as to extend along an axial direction X of the lead screw portion 61c, and a pair of first and second flange portions 62b, 62c formed by bending both end portions of the flat panel portion 62a extending along the axial direction X so as to correspond to the stepping motor 61a.

The first flange portion 62b positioned on the side of the stepping motor 61a is formed with a through hole 62d which allows penetration of an end portion (terminal end portion) 61d of the lead screw portion 61c and a first fitting hole 62e which allows fitting of one end portion of the guide shaft 64. The first flange portion 62b and the required portion of the stepping motor 61a are fixed to each other with predetermined mounting means, whereby the stepping motor 61a is fixedly supported by the supporting member 62 in the immovable state.

In contrast, the side of the second flange portion 62c which is paired with the first flange portion 62b is formed with a hole (not shown) corresponding to the through hole 62d and a second fitting hole 62f corresponding to the first fitting hole 62e to allow fitting of the other end portion of the guide shaft 64. A bearing member G is fitted to the hole provided on the second flange portion 62c. Then, a portion of distal end portion 61e of the lead screw portion 61c which is positioned on the side of the distal end of the projecting portion projecting on the side of the bearing member G penetrating through the through hole 62d is axially supported by the bearing member G so as to be rotatable.

Reference numerals 62g, 62h designate first and second screw tightening portions provided at positions corresponding to first and second screw holes, described later, of the oscillation preventing member 66 for tightening threaded portions of screws S1 which penetrate through the first and second screw holes. The first and second screw tightening portions 62g, 62h as described above are formed at both end sides of the flat panel portion 62a so as to project into a substantially cylindrical shape on the side of the front surface of the flat panel portion 62a, and, more specifically, the first screw tightening portion 62g is provided in the vicinity of the first flange portion 62b and the second screw tightening portion 62h is provided in the vicinity of the second flange portion 62c.

The moving member 63 is formed of a nut screwed onto (engaged with) a predetermined portion of the lead screw portion 61c of the revolving shaft 61b, and is configured to move along the axial direction X of the lead screw portion 61c on the lead screw portion 61c by a thrust given by the rotation of the lead screw portion 61c. In this case, the moving member 63 is configured to move (reciprocate) to the distal end portion 61e or to the terminal end portion 61d of the lead screw portion 61c by the lead screw portion 61c being rotationally driven.

The guide shaft 64 is formed of, for example, an elongated cylindrical metallic material, and is fitted at one end portion thereof into the first fitting hole 62e of the supporting member 62 and at the other end portion thereof into the second fitting hole 62f of the supporting member 62 so as to be substantially in parallel to the lead screw portion 61c (revolving shaft 61b).

The power transmitting member 65 is formed of synthetic resin material such as polyacetal and includes a base portion 65a and a pair of first and second opposed walls 65c, 65d formed to project upward from a surface portion 65b of the base portion 65a so as to oppose to each other.

Figure 6:
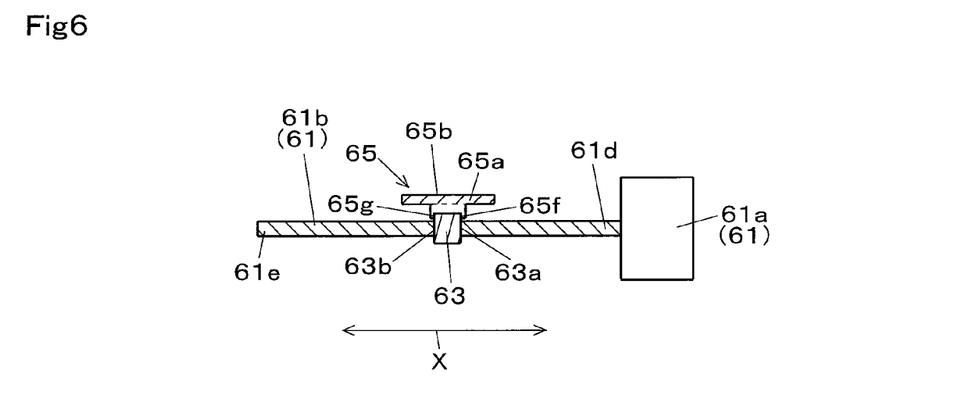
FIG. 6 is a cross-sectional view showing the positional relationship among drive means, a moving member, and the power transmitting member in the power transmission device according to the same embodiment.

The base portion 65a includes an insertion portion 65e having a substantially circular through hole shape for allowing insertion of the guide shaft 64, and a pair of first and second abutting portions 65f, 65g being in abutment (surface contact) with required portions of first and second side surfaces 63a, 63b, which are both side surfaces of the moving member 63 (see FIG. 6). In this case, the first and second abutting portions 65f, 65g are integrally formed with the base portion 65a so as to partially sandwich the first and second side surfaces 63a, 63b of the moving member 63.

In this case, the surface of the moving member 63 on the side of the first flange portion 62b is the first side surface 63a, and the surface of the same on the side of the second flange portion 62c is the second side surface 63b. The first abutting portion 65f is in abutment with the first side surface 63a and the second abutting portion 65g is in abutment with the second side surface 63b, whereby the moving member 63 is sandwiched between the first and second abutting portions 65f, 65g.

The first and second opposed walls 65c, 65d are formed with a pair of first and second projecting portions 65h, 65i which come respectively into point contact with the suspending portion 42e (both surfaces 42g, 42h) of the projecting strip 42c of the mirror holder 42 on the distal end sides thereof.

The first and second projecting portions 65h, 65i as described above each have a substantially semicircular shape, and are formed so as to sandwich the suspending portion 42e so as to allow vertex portions thereof to come into point contact with the both surfaces 42g, 42h of the suspending portion 42e. In other words, the first projecting portion 65h and the second projecting portion 65i are arranged so as to oppose to each other with a predetermined gap provided therebetween, and the suspending portion (power transmitted member) 42e is interposed in the gap so that the first and second projecting portions 65h, 65i and the both surfaces 42g, 42h come into point contact with each other, respectively.

The oscillation preventing member 66 is formed of soft synthetic resin material (for example, polypropylene resin), and includes a substantially rectangular flat-panel shaped base portion 66a provided so as to correspond to the flat panel portion 62a of the supporting member 62. The oscillation preventing member 66 as described above is provided with an oscillation attenuating function which attenuates oscillation generated when the stepping motor 61a is driven while it is transmitted from the supporting member 62 to the housing 50.

A first lug portion 66b is formed so as to project sideward of the base portion 66a at a first corner C1 provided at a position corresponding to a first boss portion, described later, of the housing 50 from among four corners of the base portion 66a of the oscillation preventing member 66 so as to have the substantially same thickness as that of the base portion 66a. A second lug portion 66c is formed so as to project sideward of the base portion 66a at a second corner C2 provided in the direction of the diagonal line with respect to the first corner C1 and at a position corresponding to a second boss portion, described later, of the housing 50 so as to have the substantially same thickness as that of the base portion 66a.

Reference numerals 66d, 66e designate first and second screw holes provided so as to communicate with the first and second screw tightening portions 62g, 62h of the supporting member 62, respectively, and are formed of through holes for allowing penetration of the threaded portions of the screws S1 therethrough from the back side of the base portion 66a. The first and second screw holes 66d, 66e as described above are positioned on both end sides of the base portion 66a, the first screw hole 66d is provided on the side of the first flange portion 62b and the second screw hole 66e is provided on the side of the second flange portion 62c.

Then, the fixation between the oscillation preventing member 66 and the supporting member 62 is completed by penetrating the threaded portions of the screws S1 through the first and second screw holes 66d, 66e respectively from the backside of the base portion 66a, and tightening the required portions of the threaded portions of the screws S1 penetrated through the respective screw holes 66d, 66e into the first and second screw tightening portions 62g, 62h, respectively. This means that the supporting member 62 and the oscillation preventing member 66 are fixed with the screws S1.

Reference numeral 66f designates a third screw hole provided so as to be connected with a third screw tightening portion, described later, provided on the first boss portion, and is formed of a through hole for allowing penetration of a threaded portion of a screw S2 therethrough from the front side of the base portion 66a, and the third screw hole 66f as described above is formed at a predetermined position of the first lug portion 66b.

In the same manner, reference numeral 66g designates a fourth screw hole provided so as to be connected with a fourth screw tightening portion, described later, provided on the first boss portion, and is formed of a through hole for allowing penetration of the threaded portion of the screw S2 therethrough from the front side of the base portion 66a, and the fourth screw hole 66g as described above is formed at a predetermined position of the second lug portion 66c.

In the power transmission device 43 configured as described above, when the lead screw portion 61c is rotationally driven upon receipt of the rotational drive force from the stepping motor 61a, the moving member 63 engaged with the lead screw portion 61c reciprocates along the axial direction X. Then, for example, when the moving member 63 is moved toward the first flange portion 62b, a thrust to move the first abutting portion 65f which is in surface contact therewith toward the first flange portion 62b is applied to the first side surface 63a of the moving member 63.

With the action of the thrust as described above, the power transmitting member 65 moves toward the first flange portion 62b in parallel along the axial direction X synchronously with the movement of the moving member 63 in a state of being guided by the guide shaft 64. Then, in association with the parallel movement of the power transmitting member 65, a power to rotate the mirror holder 42 is transmitted to the suspending portion 42e, which is the power transmitted member interposed between the respective projecting portions 65h, 65i of the power transmitting member 65. In this case, with the power transmission to the suspending portion 42e, the mirror holder 42 rotates in the direction indicated by an arrow in FIG. 4 about the axis of rotary movement RA.

In other words, the power transmitting member 65 in this example is intended to be moved along the axial direction X of the lead screw portion 61c by the rotational driving of the lead screw portion 61c, and transmit the power to the suspending portion (power transmitted member) 42e of the mirror holder 42. Then, by moving the angular position of the mirror holder 42 (concave mirror 41) about the axis of rotary movement RA by the power transmission to the suspending portion 42e, the direction of projection of the display light L with respect to the front glass 13 is adjusted and, in association with this, the position of the display image V which is visible for the user 14 can be moved up and down (vertical direction) on the front glass 13.

In addition, in this example, when the stepping motor 61a is driven on the basis of the drive signal, the lead screw portion 61c is rotationally driven, and the power transmitting member 65 moves along the axial direction X and, at a time point when the movement (positional adjustment) of the power transmitting member 65 is completed, the controller 70 does not output the drive signal to the stepping motor 61a. In other words, the controller 70 is configured to control the output of the drive signal to the stepping motor 61a to be stopped when the power transmitting member 65 is not moved along the axial direction X. It is needless to say that the power transmitting member 65 is strongly held by the lead screw portion 61c while the output of the drive signal is stopped because the moving member 63 formed of a nut is tightened onto the lead screw portion 61c formed with the screw groove.

Therefore, since the power transmitting member 65 is strongly held by the lead screw portion 61c and the drive signal is not supplied to the stepping motor 61a (that is, no electric current is supplied to the exciting coil, not shown, provided on the stepping motor 61a) after having adjusted the disposed position of the power transmitting member 65 to the predetermined position, the heat radiation value that generated by the stepping motor 61a can be reduced in comparison with that in the related art.

It is needless to say that the power transmitting member 65 moves toward the second flange portion 62c in parallel when the moving member 63 moves toward the second flange portion 62c instead of the first flange portion 62b, whereby a power to rotate the mirror holder 42 about the axis of rotary movement RA in the direction opposite from the direction of the arrow indicated in FIG. 4 acts on the suspending portion 42e.

The housing 50 is formed using, for example, an aluminum die casting and includes an upper case member 51 and a lower case member 52 both having a substantially depressed shape in cross-section, and is configured to accommodate the liquid crystal display 20, the first reflector 30, and the second reflector 40 in a space 53 as an internal space defined by the upper case member 51 and the lower case member 52 (see FIG. 2).

The upper case member 51 is formed with an opening window 51a opening above the position where the concave mirror 41 is disposed (on the side of the front glass 13 of the vehicle 10), and a translucent cover 54 which corresponds to an light-output portion is disposed on the opening window 51a so as to close the opening window 51a.

The translucent cover 54 as described above is formed of translucent synthetic resin material (for example, acrylic resin), and has a function as a light-translucent member which allows transmission (passage) of the display light L reflected by the concave mirror 41. In other words, the display light L reflected by the concave mirror 41 is projected on the front glass 13 through the translucent cover 54 formed on the housing 50, whereby the display of the virtual image V is achieved.

In contrast, a pair of first and second boss portions 52a, 52b having a substantially cylindrical shape projecting from a bottom portion toward the oscillation preventing member 66 as shown in FIG. 4 are provided on the bottom portion of the lower case member 52.

The first boss portion 52a includes a third screw tightening portion 52c for tightening the screw S2 therein, and the third screw tightening portion 52c as described above is in communication with the third screw hole 66f provided through the oscillation preventing member 66. In contrast, the second boss portion 52b includes a fourth screw tightening portion 52d for tightening the screw S2 therein, and the fourth screw tightening portion 52d as described above is in communication with the fourth screw hole 66g provided through the oscillation preventing member 66.

Then, the fixation between the oscillation preventing member 66 and the housing 50 (respective boss portions 52a, 52b) is completed by penetrating the threaded portions of the screws S2 through the third and fourth screw holes 66f, 66g respectively from the front side of the base portion 66a, and tightening the required portions of the threaded portions of the screws S2 penetrated through the respective screw holes 66f, 66g into the third and fourth screw tightening portions 52c, 52d provided in the respective boss portions 52a, 52b. This means that the oscillation preventing member 66 and the housing 50 (respective boss portions 52a, 52b) are fixed with the screws S2.

As described above, in this embodiment, the stepping motor 61a configured to be driven on the basis of the drive signal from the controller 70, the lead screw portion 61c configured to be rotationally driven in association with the drive of the stepping motor 61a, and the power transmitting member 65 configured to be moved along the axial direction X of the lead screw portion 61c by the rotation of the lead screw portion 61c and transmit the power to the suspending portion 42e as the power transmitted member, and the controller 70 is configured to control the output of the drive signal to the stepping motor 61a to be stopped when the power transmitting member 65 is not moved along the axial direction X.

Therefore, since the power transmitting member 65 is strongly held by the lead screw portion 61c and the drive signal is not supplied to the stepping motor 61a (that is, no electric current is supplied to the exciting coil provided on the stepping motor 61a) after having adjusted the disposed position of the power transmitting member 65 to the predetermined position, the heating value that the stepping motor 61a by itself generates can be reduced in comparison with that in the related art. Therefore, according to the present invention, since the heat radiation value that generated by the stepping motor 61a can be reduced in comparison with that in the related art, the possibility of breakage of the stepping motor due to the heat generation of the stepping motor is eliminated.

In this embodiment, an example in which the moving member 63 which is engaged with the lead screw portion 61c and is configured to move along the axial direction X of the lead screw portion 61c by the rotation of the lead screw portion 61c is provided, and the power transmitting member 65 moves along the axial direction X synchronously with the movement of the moving member 63 to transmit the power to the suspending portion (power transmitted member) 42e has been described. However, for example, a configuration in which the moving member 63 is eliminated, and the required portion of the power transmitting member 65 and the lead screw portion 61c are engaged with each other, and the power transmitting member 65 moves along the axial direction X of the lead screw portion 61c by the rotation of the lead screw portion 61c to transmit the power to the suspending portion 42e is also applicable.

In this embodiment, an example in which the power is transmitted to the suspending portion 42e using the power transmission device 43 to adjust the angular position of the mirror holder 42 (concave mirror 41) is described. However, a configuration in which the power transmission device 43 is employed in the above-described liquid crystal display 20, for example, is also applicable.

Specifically, although the detailed illustration in the drawings is omitted, a configuration in which a window portion which allows passage of the illuminating light emitted from the light source 21 is provided, a predetermined portion of a movable supporting member on which the liquid crystal display element 22 is placed (supported) (for example, a flange portion having an upright shape extending outward of the movable supporting member) is positioned between the first and second projecting portions 65h, 65i of the power transmitting member described above, the power is transmitted to the predetermined portion (the flange portion) as the power transmitted member by the movement of the power transmitting member 65, and the movable supporting member (liquid crystal display element 22) is rotated clockwise or counterclockwise with reference to the predetermined portion to adjust the disposed position of the liquid crystal display element 22 in the liquid crystal display 20 is also applicable. In this configuration, the inclination of the virtual image V with respect to the front glass 13 (that is, the inclination of the virtual image V that is visually recognizable by the user 14 with respect to a virtual horizontal line) can be adjusted.

INDUSTRIAL APPLICABILITY

The present invention can be applied to the power transmission device which is configured to transmit the power to the mirror holder which holds the reflecting member such as the concave mirror provided on the head-up display apparatus for a vehicle and adjust the angular position of the reflecting member.

REFERENCE NUMERALS 40 second reflector
41 concave mirror (reflecting member)
42 mirror holder
42e suspending portion (power transmitted member)
43 power transmission device
61 drive means
61a stepping motor (driving member)
61c lead screw portion
62 supporting member
63 moving member
64 guide shaft
65 power transmitting member
66 oscillation preventing member
70 controller
RA axis of rotary movement
X axial direction

The invention claimed is:

1. A power transmission device comprising:
a driving member configured to be driven on the basis of a command signal from a controller;
a lead screw portion configured to be rotationally driven in association with the drive of the driving member; and
a power transmitting member configured to move along an axial direction of the lead screw portion in accordance with the rotation of the lead screw portion to transmit the power to a power transmitted member,
characterized in that:
the controller is configured to control the output of the command signal to the driving member to be stopped so that electric current is not supplied to an exciting coil of the driving member when the power transmitting member is not moved along the axial direction,
the power transmitting member includes a pair of projecting portions that each come into point contact with the power transmitted member so as to sandwich the power transmitted member,
the power transmitted member rotates about an axis of rotation,
the power transmitting member transmits power through the point contact to the power transmitted member to rotate the power transmitted member about the axis of rotation,
the power transmitting member is formed with an insertion portion configured to allow insertion of a guide shaft which extends substantially parallel to the lead screw portion, and
a movement of the power transmitting member along the axial direction of the lead screw portion causes a holder connected to the guide shaft to rotate about an axis of rotation.

2. The power transmission device according to claim 1, comprising a moving member configured to be engaged with the lead screw portion and move along the axial direction in accordance with a thrust given by the rotation of the lead screw portion,
characterized in that the power transmitting member moves along the axial direction synchronously with the movement of the moving member.

3. The power transmission device according to claim 1, wherein a concave mirror is connected to the holder, and movement of the power transmitting member along the axial direction of the lead screw portion further causes an angular position of the mirror to be adjusted.

4. The power transmission device according to claim 1, wherein the axis of rotation of the power transmitted member is orthogonal to the movement direction of the power transmitting member along the axial direction of the lead screw.

5. The power transmission device according to claim 1, wherein the pair of projecting portions of the power transmitting member are disposed so as to oppose each other across a predetermined gap, and the power transmitted member is interposed in the gap so as to come into point contact with each projecting portions.

6. A power transmission device comprising:
a driving member configured to be driven on the basis of a command signal from a controller;
a lead screw portion configured to be rotationally driven in association with the drive of the driving member; and
a power transmitting member configured to move along an axial direction of the lead screw portion in accordance with the rotation of the lead screw portion to transmit the power to a power transmitted member,
characterized in that:
the controller is configured to control the output of the command signal to the driving member to be stopped so that electric current is not supplied to an exciting coil of the driving member when the power transmitting member is not moved along the axial direction,
the power transmitting member includes a pair of projecting portions that each come into point contact with the power transmitted member so as to sandwich the power transmitted member,
the power transmitted member rotates about an axis of rotation,
the power transmitting member transmits power through the point contact to the power transmitted member to rotate the power transmitted member about the axis of rotation,
the pair of projecting portions of the power transmitting member are disposed so as to oppose each other across a predetermined gap, and the power transmitted member is interposed in the gap so as to come into point contact with each projecting portions, and
a width direction of the gap measured between the pair of projecting portions of the power transmitting member is parallel to the movement direction of the power transmitting member along the axial direction of the lead screw.

7. The power transmission device according to claim 6, wherein the axis of rotation of the power transmitted member is orthogonal to the movement direction of the power transmitting member along the axial direction of the lead screw.

* * * * *